United States Patent
Fukaya

Patent Number: 5,123,883
Date of Patent: Jun. 23, 1992

[54] INTERNAL MESHING TYPE PLANETARY GEAR SPEED CHANGING DEVICE

[75] Inventor: Sueo Fukaya, Obu, Japan

[73] Assignee: Sumitomo Heavy Industries, Ltd., Tokyo, Japan

[21] Appl. No.: 654,128

[22] Filed: Feb. 12, 1991

[30] Foreign Application Priority Data

Feb. 21, 1990 [JP] Japan ................. 2-38360

[51] Int. Cl.⁵ .................................. F16H 1/32
[52] U.S. Cl. ............................. 475/178; 475/162
[58] Field of Search .............. 475/162, 163, 176, 178

[56] References Cited

U.S. PATENT DOCUMENTS 4,526,064  7/1985  Carden et al. ................. 475/178 X

FOREIGN PATENT DOCUMENTS

| | | |
|---|---|---|
| 59-113340 | 6/1984 | Japan ................. 475/178 |
| 62-200839 | 12/1987 | Japan . |
| 63-30648 | 2/1988 | Japan . |
| 63-52817 | 4/1988 | Japan . |
| 63-129753 | 8/1988 | Japan . |
| 63-259248 | 10/1988 | Japan . |
| 63-285350 | 11/1988 | Japan . |
| 2-47453 | 3/1990 | Japan . |
| 2-47454 | 3/1990 | Japan . |
| 2-56943 | 4/1990 | Japan . |
| 2-56944 | 4/1990 | Japan . |
| 2-65740 | 5/1990 | Japan . |

Primary Examiner—Allan D. Herrmann
Assistant Examiner—William O. Trousdell
Attorney, Agent, or Firm—Armstrong, Nikaido, Marmelstein, Kubovcik & Murray

[57] ABSTRACT

An internal meshing type planetary gear reducer made of plastic material constructed in such a manner that an external gear fitted on an eccentric member integrally formed on an input shaft internally meshes with an internal gear, and inner pins formed on the external gear integrally therewith are inserted in inner-pin holes provided in a flange formed at one end portion of an output shaft so that rotation of the input shaft is reduced in speed and the speed-reduced rotation is transmitted to the output shaft. In the internal meshing type planetary gear reducer, each inner pin is provided with cutouts on inner and outer sides thereof in a radial direction of the external gear, or each inner-pin hole is provided with cutouts on inner and outer sides thereof in a radial direction of the flange, and only the inner pins which serve to transmit a torque at a predetermined range of the contacting location are arranged to be in contact with the inner-pin holes. With such construction, there is little resistance between the moving parts and the forcedly resistive sliding motion can be eliminated, whereby the torque transmission can be performed smoothly.

8 Claims, 7 Drawing Sheets

FIG. 11 PRIOR ART
FIG. 12 PRIOR ART
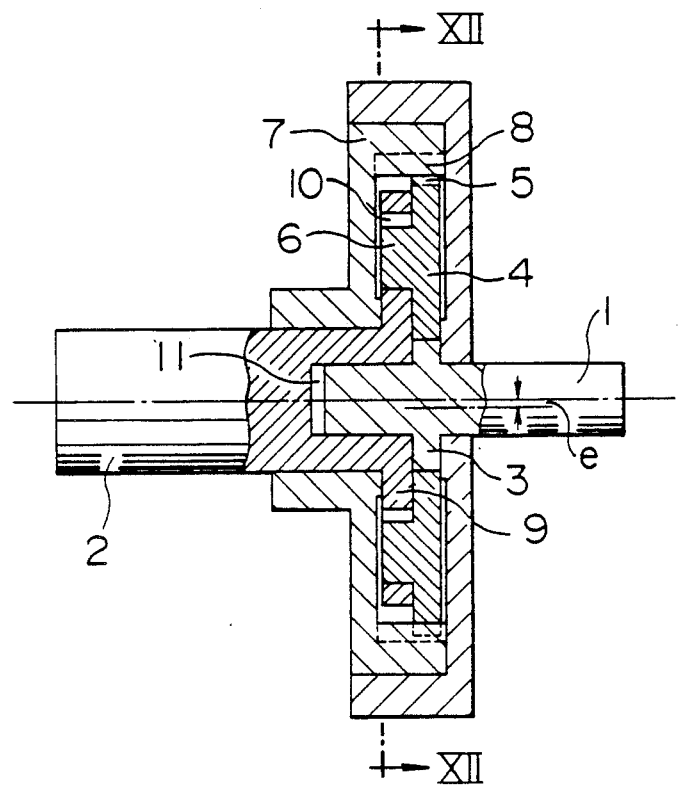
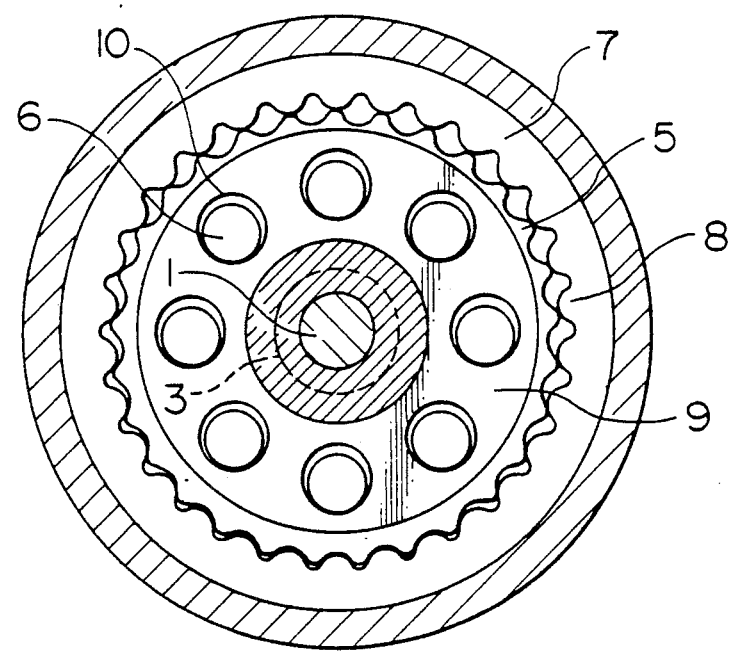

INTERNAL MESHING TYPE PLANETARY GEAR SPEED CHANGING DEVICE

BACKGROUND OF THE INVENTION

1. Field of the Invention

The present invention relates to an improvement of an internal meshing type planetary gear speed changing device in which an internal gear has teeth of circular arc profile, and an external gear has teeth of trochoidal profile inclusive of an epitrochoidal parallel curve, circular arc tooth profile or the like, so that rotation of an eccentric member fitted in the external gear causes the external gear to swingingly rotate, and that rotation thus input is output after being reduced in speed (or increased in speed) through the external and internal gears which are intermeshed with each other. More particularly, the invention relates to a structure of the internal meshing type planetary gear speed changing device which is made of plastic material such that it can be reduced in size and weight, and that it can be decreased in number of component parts, have a compact construction, and be produced at a low cost with high productivity.

2. Description of the Prior Art

There have been proposed various kinds of speed reducers in which internal meshing type planetary gear mechanisms are employed. One of these speed reducers is an internal meshing type planetary gear reducer well-known as a "Cyclo Speed Reducer" (trade mark) in which an internal gear has teeth of circular arc profile consisting of pins or combination of pins and rollers, and an external gear has teeth of trochoidal profile inclusive of an epitrochoidal parallel curve, with inner pins or inner pins and inner rollers being loosely fitted in the external gear, so that rotation of an eccentric member fitted in the external gear causes the external gear to swingingly rotate, and that rotation thus input is output after being reduced in speed through the external and internal gears which are intermeshed with each other. The "Cyclo Speed Reducer" is capable of transmitting a large torque, and its speed reduction ratio is large. Therefore, it is applied to various uses.

There is known another type of Cyclo Speed Reducer each component part of which is made of a plastic material for the purpose of further reducing the Cyclo Speed Reducer described above (hereinafter referred to as the internal meshing type planetary gear reducer) in size and weight and also in number of component parts. (See Japanese Utility Model Unexamined Publication No. 63-30648.)

This internal meshing type planetary gear reducer is made of plastic material which has not only flexibility but also a favorable sliding characteristic so that rotations are effected relatively smoothly and smooth transmission of torque is conducted in the reducer. Therefore, the internal meshing type planetary gear reducer made of plastic material is remarkably useful as a speed reducing rotational member in a domestic electric appliance, an office equipment, an automatic vending machine or the like.

One conventional example of the abovementioned internal meshing type planetary gear reducer made of plastic material will be described hereinafter with reference to FIGS. 11 and 12.

FIG. 11 is a cross-sectional view of the conventional example of internal meshing type planetary gear reducer, and FIG. 12 is a cross-sectional view of the same as FIG. 11, taken along the line XII—XII of FIG. 11.

In this example, rotation of an input shaft 1 is transmitted to an output shaft 2 in a state of being reduced in speed. The example may be, however, arranged in such a manner that the rotation reduced in speed is extracted from an internal gear 7, while the output shaft 2 being fixed.

An eccentric member 3 is integrally formed with the input shaft 1 made of a plastic material. An external gear 4 of a plastic material is fitted on the eccentric member 3. The external gear 4 is integrally provided with external teeth 5 of trochoidal profile on an outer periphery thereof. Inner pins 6 are integrally formed on the external gear 4. The inner pins 6 are formed to project from a side face of the external gear 4 in the direction substantially parallel to a longitudinal axis of the output shaft. The internal gear 7 of a plastic material also serves as a lateral wall casing on this side. Besides, this internal gear 7 is stationary in this example. The internal gear 7 is integrally formed with circular arc teeth 8 to mesh with the external teeth 5 of the external gear 4. The plastic output shaft 2 is integrally provided at the one end portion with a disk-like flange 9. This flange 9 includes inner-pin holes 10 into which the abovementioned inner pins 6 are inserted. The input shaft 1 is rotatably supported in a bearing hole 11 provided at the one end portion of the output shaft 2.

Operation of the internal meshing type planetary gear reducer having the above-described structure will now be explained.

The rotation of the input shaft 1 appears as swinging rotation of the external gear 4 via the eccentric member 3. Then, the swinging rotation of the external gear 4 is turned into rotation of the flange 9 reduced in speed through the inner pins 6, and the output force with low speed rotation of the flange 9 is transmitted to the output shaft 2.

The known internal meshing type planetary gear reducer made of plastic material as described has technical problems as follows.

FIG. 13 is a cross-sectional view showing a condition of contacts between the inner pins 6 and the inner-pin holes 10 at a moment of the operation.

Referring to FIG. 13, a center $O_1$ of the external gear 4 provided with the inner pins 6 is eccentrically disposed by a distance e, apart from a rotational center $O_2$ of the flange 9 (which is disposed at the same position as a rotational center of the output shaft 2) including the inner-pin holes 10. In the condition shown in the figure, the center $O_1$ is just below the rotational center $O_2$ at the distance e. Theoretically, the inner pin 6 at every location is in contact with the bottom of the associated inner-pin hole 10, as viewed in the figure.

A torque is transmitted when the inner pins 6 contact with the inner-pin holes 10. In the contact condition shown in FIG. 13, the torque transmission is mainly effected through the inner pins 6 and the inner-pin holes 10 located at positions X, Y, and Z because the inner pins 6 are swingingly rotated in a direction indicated b an arrow P in the figure. Contacts at the residual positions do not contribute to the torque transmission, and the resistive force interferes with the speed change function.

However, the conventional internal meshing type planetary gear reducer is so designed that the inner pins 6 at all the locations will be brought into contact with the respective inner-pin holes 10.

On the other hand, due to dimensional errors in producing individual parts, precise machining of such a gear mechanism that the inner pins 6 at all the locations are brought into contact with the inner-pin holes 10 will not be managed without difficulty or the cost for the machining will be unfavorably high. The reason is that many of internal meshing type planetary gear reducers made of plastic material, which are originally characterized by mass production at a low cost, are manufactured by injection molding which often results in molding distortion or contraction unsuitable for precise machining where very few production errors are allowed.

In the conventional internal meshing type planetary gear reducer made of plastic material, therefore, unnecessary contacts are induced owing to dimensional errors in producing individual parts so as to resist the speed change function, and the forcedly resistive sliding motion at contact portions is turned into internal load of the gear mechanism so as to increase friction resistance and noise, thus making it difficult for the gear mechanism to perform smooth transmission of the torque, with the life of the gear mechanism being shortened.

In order to solve these problems, as shown in FIG. 14, there have been proposed a method in which the diameter of each inner pin is made smaller than a theoretical value and a method in which the diameter of each inner-pin hole is made larger than a theoretical value. In these methods, however, backlashes due to play and looseness become unnecessarily larger, and controllability of normal/reverse rotation and accuracy of positioning are unfavorably deteriorated.

SUMMARY OF THE INVENTION

An object of the present invention is to provide an internal meshing type planetary gear speed changing device made of plastic material having a gear mechanism in which contacts between inner pins and inner pin-holes are smooth and do not interfere with transmission of a torque, with backlashes of the gear mechanism being kept small.

The present invention has a structure mainly characterized in that only the inner pins which serve to transmit a torque are brought into contact with inner-pin holes at a predetermined range of contacting location so as to prevent unnecessary contacts between inner pins and inner-pin holes at other locations where no torque is transmitted.

Several embodiments of the present invention will be described hereinafter with reference to the attached drawings.

BRIEF DESCRIPTION OF THE DRAWINGS

FIG. 11 is a cross-sectional view of a conventional planetary gear reducer of an internal meshing type made of plastic material;

FIG. 12 is a cross-sectional view of the same as FIG. 11, taken along the line XII—XII of FIG. 11;

DETAILED DESCRIPTION OF THE PREFERRED EMBODIMENTS

Figure 1:
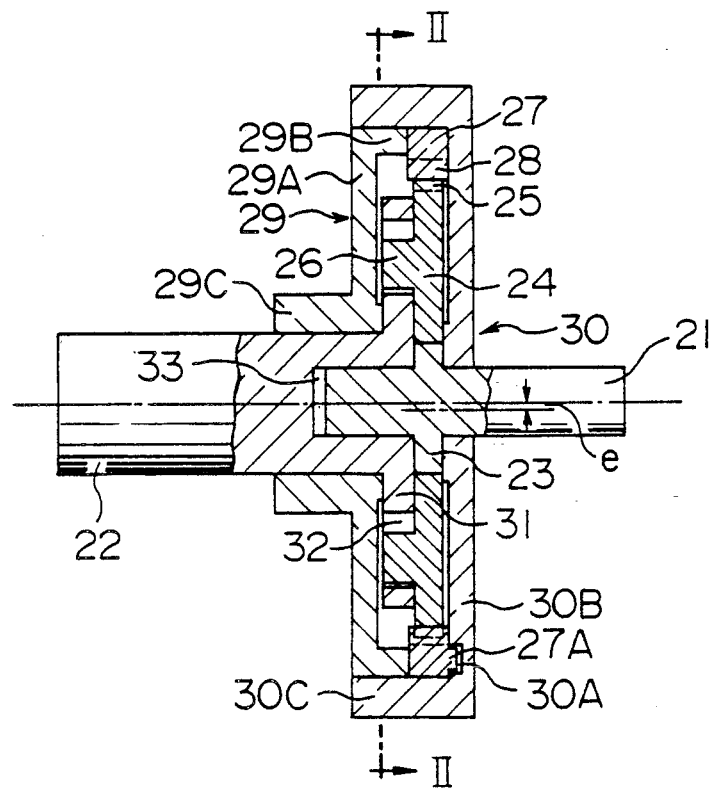
FIG. 1 is a cross-sectional view showing one embodiment of an internal meshing type planetary gear speed changing device of the present invention.
Figure 2:
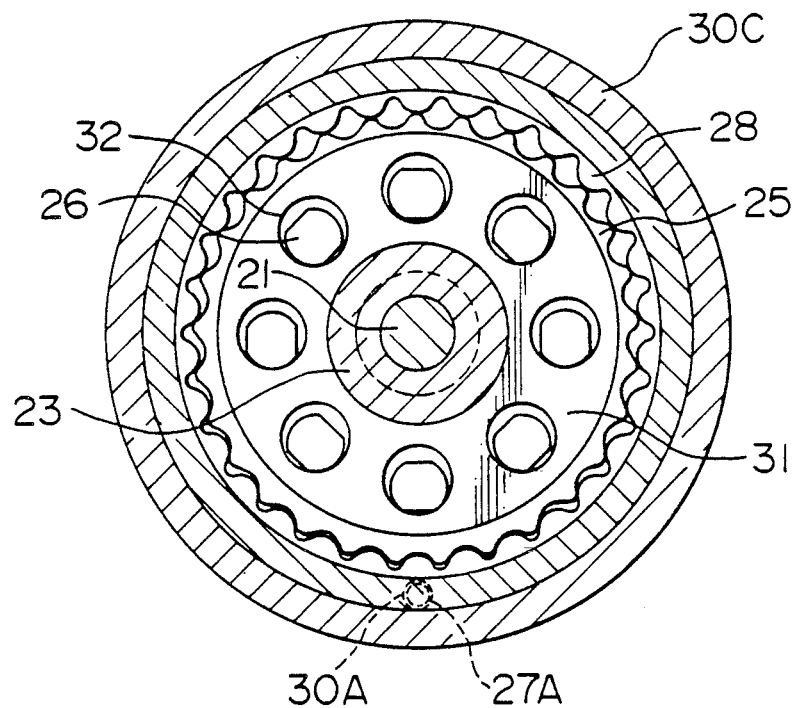
FIG. 2 is a cross-sectional view of the same as FIG. 1, taken along the line II—II of FIG. 1.

FIG. 1 is a cross-sectional view of a planetary gear speed changing device showing one preferred embodiment of the invention. FIG. 2 is a cross-sectional view of the same as FIG. 1, taken along the line II—II of FIG. 1.

In this embodiment, rotation of an input shaft 21 is transmitted to an output shaft 22 in a state of being reduced in speed. The embodiment may be, however, arranged in such a manner that the output shaft 22 is fixed while the rotation reduced in speed is extracted from an internal gear 27, or that rotation input from the output shaft 22 is increased in speed prior to being transmitted to the input shaft 21.

A disk-like eccentric member 23 is formed integrally with the input shaft 21 made of a plastic material. An external gear 24 of a plastic material is shaped like a disk and fitted on the eccentric member 23. The external gear 24 is integrally provided with external gear teeth 25 of trochoidal profile on an outer periphery thereof. A plurality of inner pins 26 are formed on the external gear 24 integrally therewith, the inner pins 26 being formed to project from a side face of the external gear 24 in the direction substantially parallel to a longitudinal axis of the output shaft. An internal gear 27 of a plastic material is formed into a ring-like configuration, separately from a casing 29. The internal gear 27 is integrally provided with teeth 28 of circular arc profile which internally mesh with the external teeth 25 of the external gear 24. The internal gear 27 is received within both of the casing 29 located on one side of the internal gear and a casing 30 located on the other side thereof. The casing 29 of a plastic material located on one side comprises an annular side wall portion 29A, a cylindrical portion 29B integrally formed on an outer periphery of the side wall portion 29A, and a cylindrical bearing portion 29C integrally formed on an inner periphery of the side wall portion 29A. The outer casing 30 is fitted on an outer periphery of the internal gear 27. The internal gear 27 is provided with a projection 27A at a certain location corresponding to a recess portion 30A which is formed in the outer casing 30 so as to be fitted on the projection 27A, thereby preventing the internal gear 27 from rotation. The outer casing 30 comprises an annular side wall portion 30B and a cylindrical portion 30C integrally formed on an outer periphery of the side wall portion 30B. The side wall portion 30B supports the input shaft 21 extending therethrough. The plastic output shaft 22 is integrally provided at the one end portion with a disk-like flange 31. The flange 31 includes inner-pin holes 32 into which the inner pins 26 are inserted. The one end of the input shaft 21 is received in a bearing bore 33 provided at the one end portion of the output shaft 22, so that the one end of the input shaft 21 is rotatably supported by means of the output shaft 22.

In the invention, the inner pins 26 have such constructions as to be described below.

Figure 3:
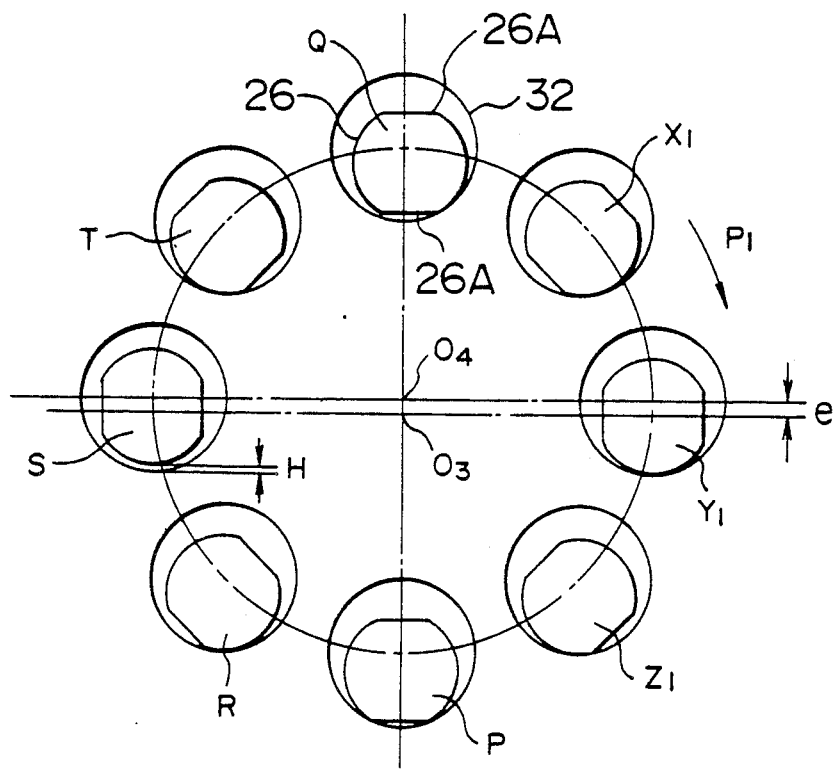
FIG. 3 is a cross-sectional view showing one embodiment of inner pins and inner-pin holes of the invention.

Referring to FIG. 3, a center $O_3$ of the external gear 24 provided with the inner pins 26 is eccentrically disposed, by a distance e apart from a rotational center $O_4$ of the flange 31 (which is disposed at the same position as a rotational center of the output shaft 22) including the inner-pin holes 32. With the embodiment in FIG. 3, the center $O_3$ is just below the center $O_4$ at the distance of e. Each inner pin 26 is provided with cutouts 26A on the inner and outer sides thereof with respect to the center $O_3$ of the external gear 24 so that a cross section of the inner pins 26 is substantially elliptic. Since the inner pins 26 are swingingly rotated in a direction indicated by an arrow $P_1$ in FIG. 3, a torque is thus transmitted from the inner pins 26 to the inner-pin holes 32 mainly through the inner pins 26 located at positions of $X_1$, $Y_1$, and $Z_1$. The inner pins 26 at the residual positions are unnecessary to be in contact with the inner-pin holes 32. More specifically, the inner pins 26 are not in contact with the inner-pin holes 32 at the positions of P and Q, due to provision of the cutouts 26A, as shown in FIG. 3. The inner pins 26 are so arranged as to be apart from the inner peripheries of the inner-pin holes 32 with slight gaps H therebetween at the positions of R, S, and T.

As described above, only the inner pins 26 located at the positions of $X_1$, $Y_1$, and $Z_1$ essentially serve to transmit the torque, and then it is enough that only the inner pins 26 at the positions of $X_1$, $Y_1$, and $Z_1$ are in contact with the inner-pin holes 32. The residual inner pins 26 are adapted not to be in contact with the inner-pin holes 32.

Operation of the internal meshing type planetary gear reducer which is one embodiment of the invention and is constructed in the above-mentioned manner, will be described hereinafter.

The rotation of the input shaft 21 appears as swinging rotation of the external gear 24 via the eccentric member 23. The torque of the swinging rotation of the external gear 24 is transmitted to the inner-pin holes 32 of the flange 31 only by the inner pins 26 located at the positions of $X_1$, $Y_1$, and $Z_1$ at a moment shown in FIG. 3, causing the rotation of the flange 31 to be reduced in speed. The output force with low speed rotation of the flange 31 is transmitted to the output shaft 22.

According to the above-described embodiment of the invention, even if there happen dimensional errors in producing individual parts, the misalignment during assembling the parts is neglected by the cutouts 26A and the gaps H. Thus, the rotation can be transmitted smoothly through the transmission mechanism.

In this embodiment, the inner pins 26 are provided with the cutouts 26A on both inner and outer sides thereof, the inner and outer sides being extended opposite to each other and facing in the radial direction of the external gear 24. The invention is, however, not restricted to the above embodiment.

Figure 4:
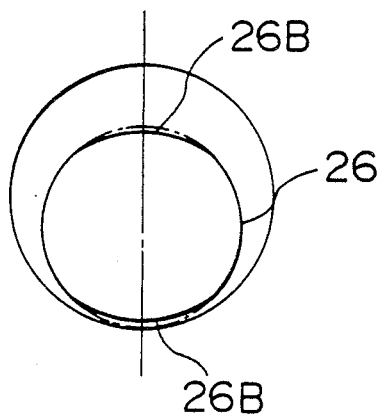
FIG. 4 is a cross-sectional view showing another embodiment of an inner pin and an inner-pin hole of the invention.

FIG. 4 illustrates another example of the cutout in accordance with the invention, in which each inner pin 26 is cut away to form the cutouts 26B on inner and outer sides thereof, the inner and outer sides being extended opposite to each other and facing in a radial direction of the external gear 24, substantially along the outer periphery of the pin 26.

Figure 5:
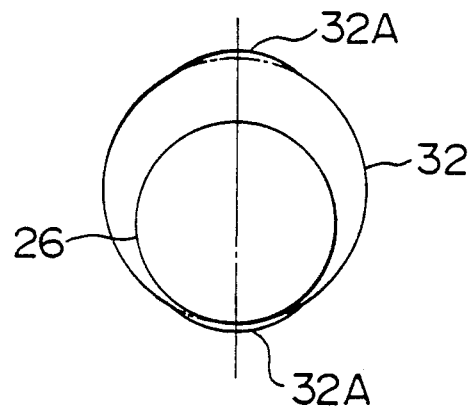
FIG. 5 is a cross-sectional view showing a still other embodiment of an inner pin and an inner-pin hole of the invention.

The invention is not restricted to provision of the cutouts on the inner pins 26. As shown in FIG. 5, each inner-pin hole 32 may be arranged in such a manner that the inner periphery of the hole is formed with cutouts 32A, the cutouts 32A being located on the inner and outer sides thereof which are extended opposite and facing to each other in a radial direction of the flange 31.

In the above-described embodiment of the invention, the cutouts may be formed on either the inner pins 26 or the inner-pin holes 32.

There remains some problems concerning production cost and precision in machining the cutouts on the pins or the pin holes. Accordingly, it is difficult to execute the formation of the cutouts. In order to readily suitably form the cutouts, shapes of the cutouts should be adequately designed and the convenient plastic moulding technique has to be applied to the formation of the cutouts.

Figure 6:
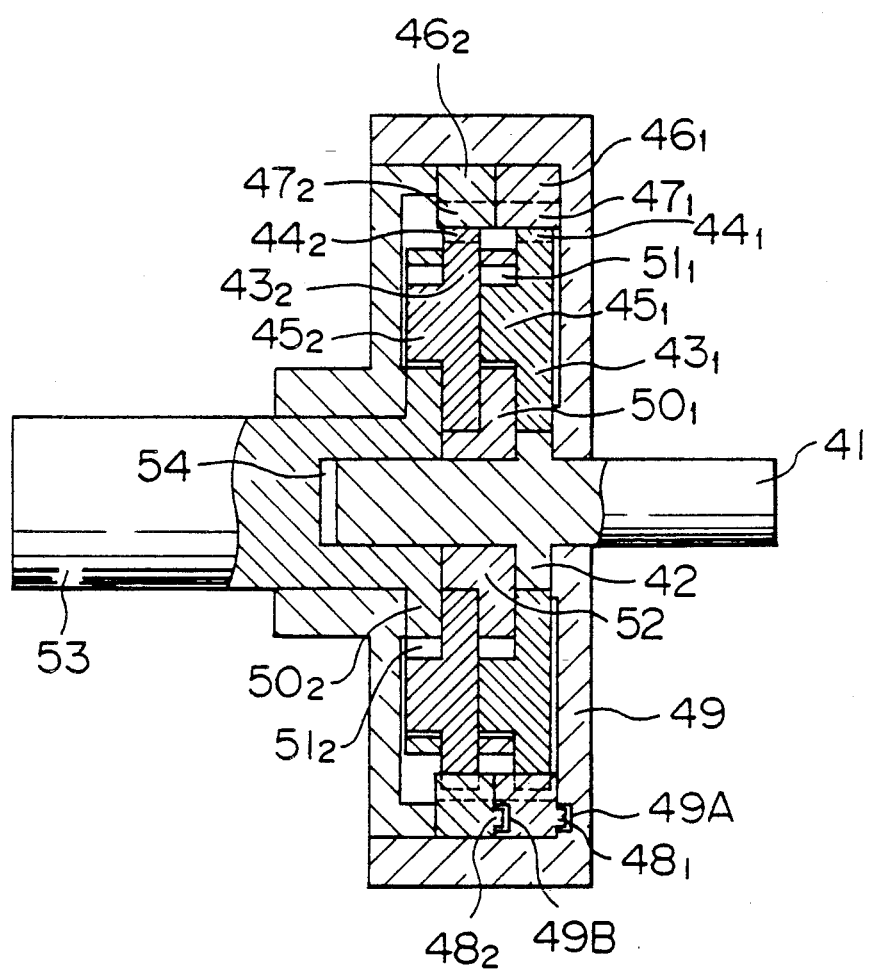
FIG. 6 is a cross-sectional view of a multistage planetary gear speed changing device of an internal meshing type according to the present invention.

FIG. 6 shows in cross section a second embodiment of a multistage planetary gear reducer of the internal meshing type, according to the invention. An input shaft 41 made of a plastic material is integrally formed with a disk-like eccentric member 42. A first external gear $43_1$ of a plastic material is shaped like a disk and fitted on the eccentric member 42. External teeth $44_1$ of trochoidal profile are provided on an outer periphery of the first external gear $43_1$ formed integrally therewith. The first external gear $43_1$ includes a plurality of integrally-formed inner pins $45_1$. The inner pins $45_1$ are formed so as to project from a lateral surface of the first external gear $43_1$ in the direction substantially parallel to a longitudinal axis of the input shaft. A first internal gear $46_1$ made of a plastic material is in a ring-like configuration. Gear teeth $47_1$ of circular arc profile which internally mesh with the external teeth $44_1$ of the first external gear $43_1$ are provided on an inner periphery of the first internal gear $46_1$ formed integrally therewith. The plastic first internal gear $46_1$ is provided with a projection $48_1$ at a certain location corresponding to a recess portion 49A which is formed in an outer casing 49 of a plastic material so as to be fitted on the projection $48_1$, thereby preventing the first internal gear $46_1$ from rotational movement. The input shaft 41 rotatably supports a first flange $50_1$, of a plastic material which is formed with inner-pin holes $51_1$ and integrally provided with an eccentric member 52. The inner pins $45_1$ are inserted in the inner-pin holes $51_1$ formed in the first flange $50_1$. The input shaft 41 is provided extending through the first flange $50_1$ and the eccentric member 52. The eccentric member 52 is fitted in a second external gear $43_2$ made of a plastic material. The second external gear $43_2$ is provided with a plurality of inner pins $45_2$ formed integrally therewith. The inner pins $45_2$ are formed to project from a lateral face of the second external gear $43_2$ in the direction substantially parallel to the longitudinal axis of the input shaft 41. A second internal gear $46_2$ made of a plastic material is in a ring-like configuration. Teeth $47_2$ of circular arc profile which internally mesh with external teeth $44_2$ of the second external gear $43_2$ are formed on an inner periphery of the second internal gear $46_2$ integrally therewith. The second internal gear $46_2$ is provided with a projection $48_2$ at a certain location corresponding to a recess portion 49B which is formed in a lateral surface of the first internal gear $46_1$ so as to be fitted on the projection $48_2$, thereby preventing the second internal gear $46_2$ from rotational movement. A disk-like second flange $50_2$ is integrally formed at one end portion of an output shaft 53 made of a plastic material. The second flange $50_2$ is provided with inner-pin holes $51_2$ where the inner pins $45_2$ of the second external gear $43_2$ are inserted. The end portion of the input shaft 41 is inserted into a bearing bore 54 formed at the end portion of the output shaft 53 so as to be supported rotatably by the output shaft 53.

The multistage planetary gear reducer of the internal meshing type constructed in the above-mentioned manner which is the second embodiment of the invention will operate as follows.

Rotation of the input shaft 41 appears in a form of swinging rotation of the first external gear $43_1$ through the eccentric member 42. Then, a torque of the swinging rotation of the first external gear $43_1$ is transmitted to the inner-pin holes $51_1$ of the first flange $50_1$ via the inner pins $45_1$, causing the rotation of the flange $50_1$ to be reduced in speed. The speedreduced rotation of the first flange $50_1$ swingingly rotates the second external gear $43_2$ through the eccentric member 52. Subsequently, a torque of the swinging rotation of the second external gear $43_2$ is transmitted to the inner-pin holes $51_2$ of the second flange $50_2$ via the inner pins $45_2$, thereby enabling the rotation of the second flange $50_2$ to be reduced in speed. The rotation of the second flange $50_2$ is transmitted to the output shaft 53 in a state of low speed rotation of the output shaft 53.

In the above multistage planetary gear reducer, the shapes and constructions of the inner pins and the inner-pin holes are substantially the same as those of the planetary gear reducer shown in FIGS. 1 to 5.

Figure 7:
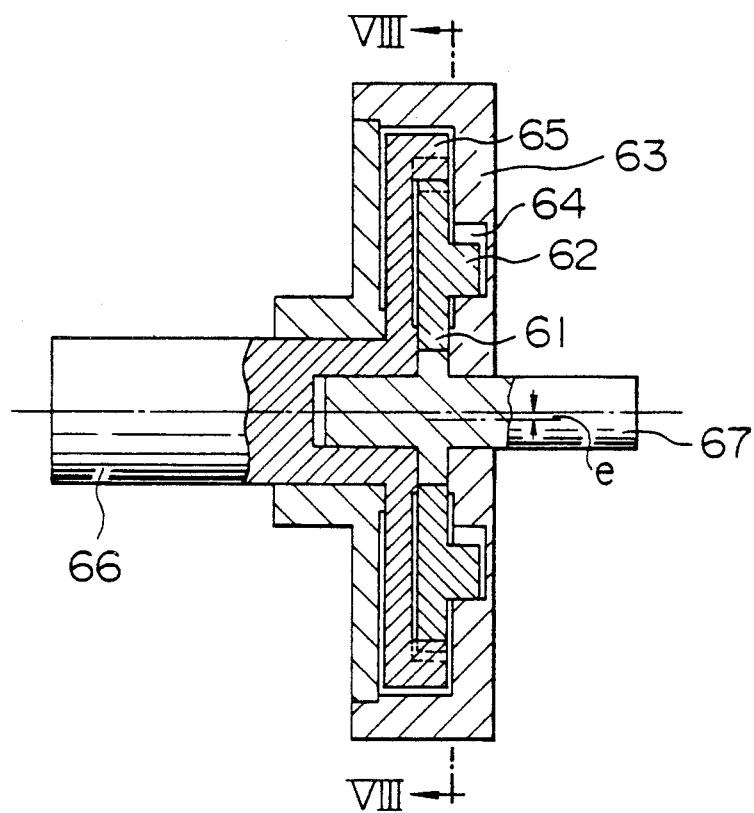
FIG. 7 is a cross-sectional view showing a different embodiment of an internal meshing type planetary gear speed changing device of the invention.
Figure 8:
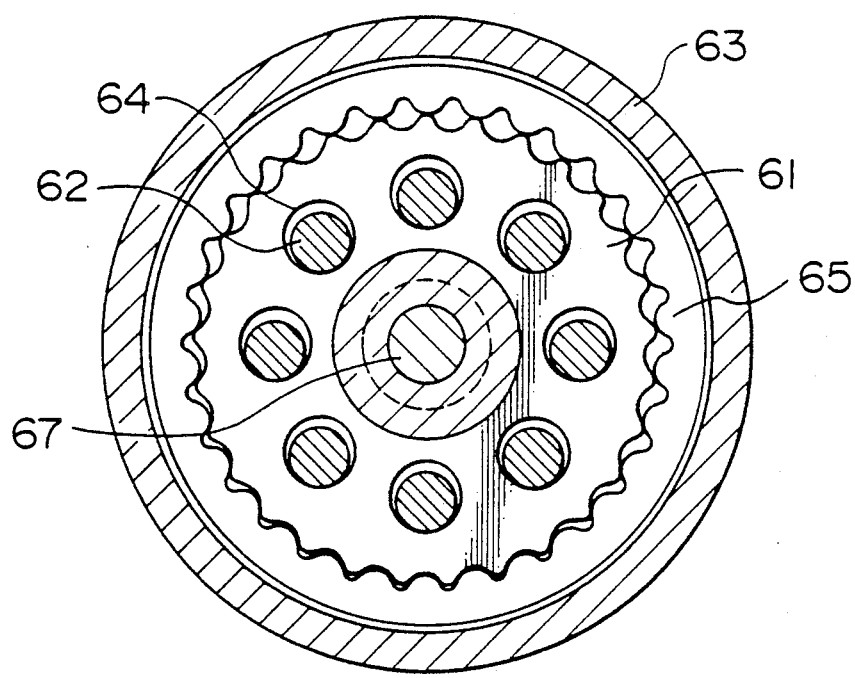
FIG. 8 is a cross-sectional view of the same as FIG. 7, taken along the line VIII—VIII of FIG. 7.

FIGS. 7 and 8 illustrate a third embodiment of the invention, in which inner pins 62 of an external gear 61 are received in inner-pin holes 64 formed on an outer casing 63. An internal gear 65 which meshes with the external gear 61 is integrally formed on an outer periphery of a flange which is provided at one end portion of an output shaft 66.

In this embodiment, rotation of the input shaft 67 appears in a state of swinging rotation of the internal gear 65 reduced in speed, and the output shaft 66 rotates at the reduced speed together with the internal gear 65.

Figure 9:
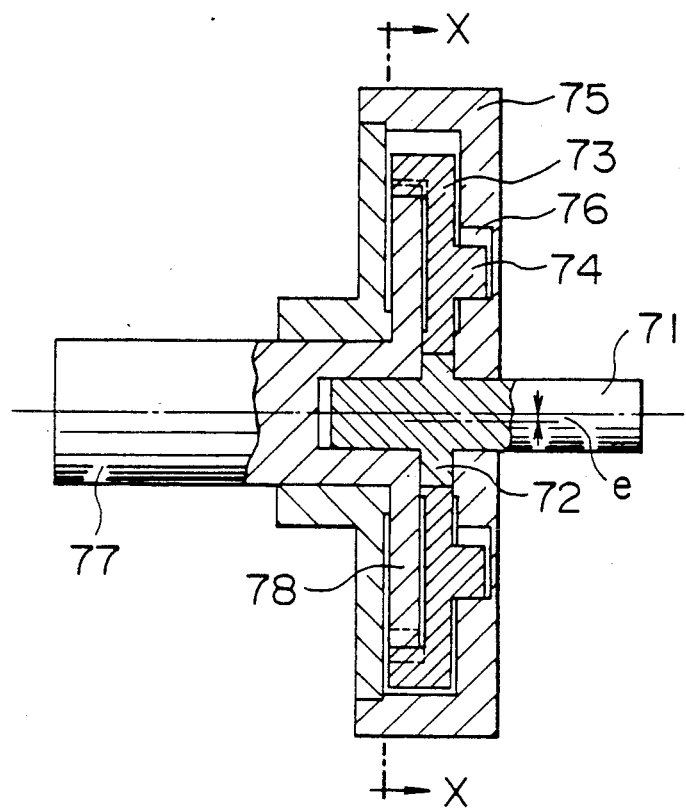
FIG. 9 is a cross-sectional view showing a further embodiment of an internal meshing type planetary gear speed changing device of the invention.
Figure 10:
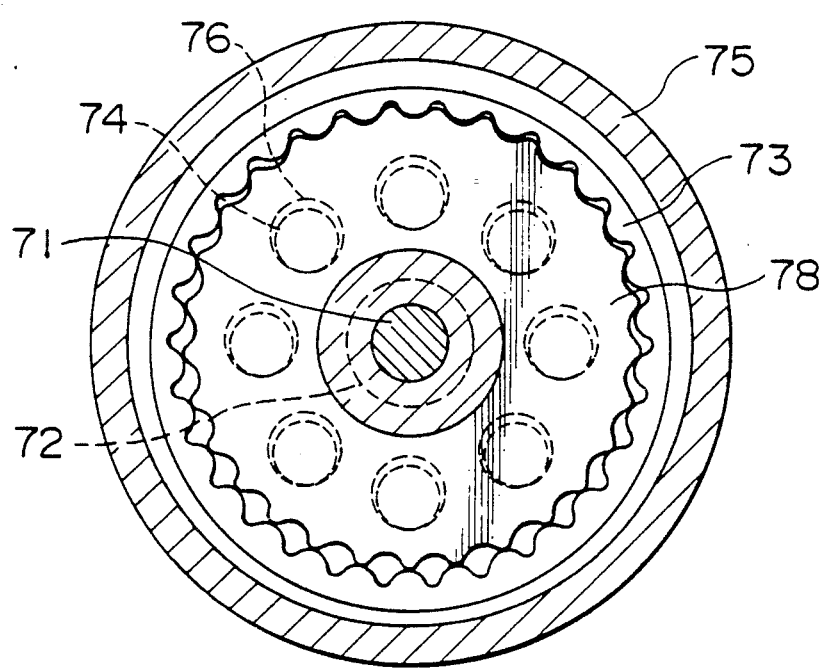
FIG. 10 is a cross-sectional view of the same as FIG. 9, taken along the line X—X of FIG. 9.
Figure 13:
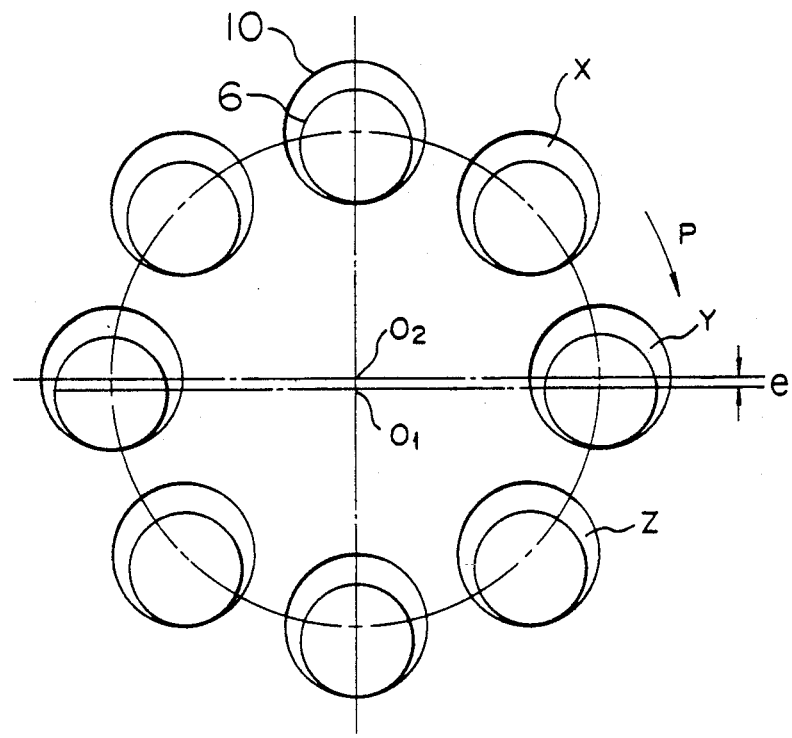
FIG. 13 is a cross-sectional view of inner pins and inner-pin holes having a certain structure in the conventional planetary gear reducer of the internal meshing type made of plastic material.
Figure 14:
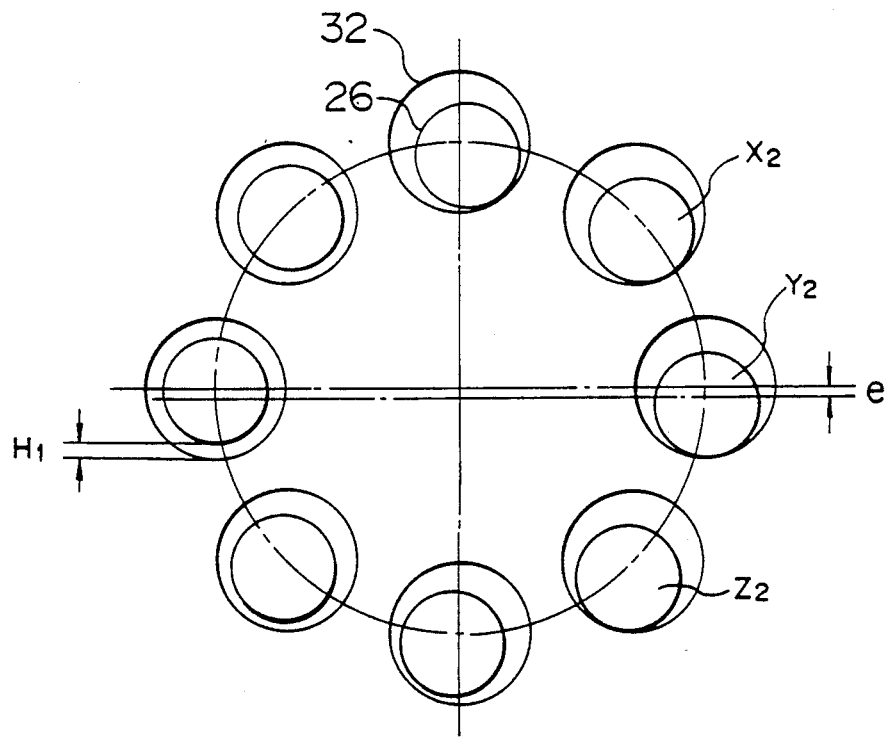
FIG. 14 is a cross-sectional view of inner pins and inner-pin holes having a different structure in which each inner pin is simply reduced in diameter.

There is shown a fourth embodiment of the invention in FIGS. 9 and 10. In this embodiment, an internal gear 73 including an annular portion and a cylindrical portion is fitted on an eccentric member 72 integrally formed with an input shaft 71 so as to be swingingly rotated. The internal gear 73 is integrally provided with inner pins 74 which are inserted in inner-pin holes 76 formed in an outer casing 75. An external gear 78 integrally formed at one end portion of an output shaft 77 internally mesh with the internal gear 73.

In accordance with the above embodiment, rotation of the input shaft 71 appears in a state of swinging rotation of the internal gear 73 reduced in speed through the eccentric member 72. The swinging rotation of the internal gear 73 leads to speed-reduced rotation of the external gear 78 which is transmitted to the output shaft 77.

In this embodiment, the corresponding relation between the respective inner pins and the inner-pin holes is predetermined as shown in FIGS. 1 to 5. When the embodiment is constructed into a multistage type, the interconnecting arrangements of the inner pins and inner-pin holes are almost similar to those in the embodiment shown in FIGS. 1 to 5.

Further, the internal meshing type planetary gear reducer according to the invention also operates as a speed increaser if the input and output shafts are interchanged with each other to be reversely operated, and therefore the application of the invention is not restricted to the speed reducer.

The invention constructed and operating in the above-mentioned manner, achieves such effect as to be stated below.

During operation of the mechanism, since only the inner pins which serve to transmit a torque at an arbitrary moment are in contact with the inner-pin holes so as to transmit the torque while the residual inner-pins are not in contact with the inner-pin holes, there is little wear between the moving parts and the forcedly resistive sliding motion can be eliminated in the mechanism, whereby the torque transmission can be performed smoothly.

What is claimed is:

1. An internal meshing type planetary gear speed changing device made of plastic material comprising an input shaft integrally formed with an eccentric member; an external gear fitted on said eccentric member; inner pins formed on said external gear integrally therewith; an internal gear to mesh with said external gear; an output shaft provided with a flange at its one end; and inner-pin holes formed in said flange for insertion of said inner pins, wherein each inner pin is provided with cutouts on inner and outer sides thereof, the inner and outer sides being extended opposite to each other and facing in a radial direction of said external gear, and only the inner pins which serve to transmit a torque are arranged to be in contact with the inner-pin holes at a predetermined range of contacting location.

2. An internal meshing type planetary gear speed changing device made of plastic material comprising an input shaft integrally formed with an eccentric member; an external gear fitted on said eccentric member; inner pins formed on said external gear integrally therewith; an internal gear to mesh with said external gear; an output shaft provided with a flange at its one end; and inner-pin holes formed in said flange for insertion of said inner pins, wherein each inner-pin hole is provided with cutouts on inner and outer sides thereof, the inner and outer sides being extended opposite to each other and facing in a radial direction of said flange, and only the inner pins which serve to transmit a torque are arranged to be in contact with the inner-pin holes at a predetermined range of contacting location.

3. An internal meshing type planetary gear speed changing device made of plastic material comprising an input shaft integrally formed with an eccentric member; an external gear fitted on said eccentric member; inner pins formed on said external gear integrally therewith; a flange formed at one end portion of an output shaft integrally therewith; an internal gear including a cylindrical portion integrally provided on an outer periphery of said flange so as to mesh with said external gear; one casing and another outer casing for receiving said eccentric member, said external gear and said flange; and inner-pin holes formed in said outer casing for insertion of said inner pins, wherein each inner pin is provided with cutouts on inner and outer sides thereof, the inner and outer sides being extended opposite to each other and facing in a radial direction of said external gear, and only the inner pins which serve to transmit a torque are arranged to be in contact with the inner-pin holes at a predetermined range of contacting location.

4. An internal meshing type planetary gear speed changing device made of plastic material comprising an input shaft integrally formed with an eccentric member; an external gear fitted on said eccentric member; inner pins formed on said external gear integrally therewith; a flange formed at one end portion of an output shaft integrally therewith; an internal gear including a cylindrical portion integrally provided on an outer periphery of said flange so as to mesh with said external gear; one casing and another outer casing for receiving said eccentric member, said external gear and said flange; and inner-pin holes formed in said outer casing for insertion of said inner pins, wherein each inner-pin hole is provided with cutouts on inner and outer sides thereof, the inner and outer sides being extended to each other and facing in a radial direction of said outer casing, and only the inner pins which serve to transmit a torque are arranged to be in contact with the inner-pin holes at a predetermined range of contacting location.

5. An internal meshing type planetary gear speed changing device made of plastic material comprising an input shaft integrally formed with an eccentric member; an internal gear fitted on said eccentric member; inner pins formed on said internal gear integrally therewith; an external gear formed at one end portion of an output shaft integrally therewith so as to mesh with said internal gear; one casing and another outer casing for receiving said eccentric member, said internal gear and said external gear; and inner-pin holes formed in said outer casing for insertion of said inner pins, wherein each inner pin is provided with cutouts on inner and outer sides thereof, the inner and outer sides being extended opposite to each other and facing in a radial direction of said internal gear, and only the inner pins which serve to transmit a torque are arranged to be in contact with the inner-pin holes at a predetermined range of contacting location.

6. An internal meshing type planetary gear speed changing device made of plastic material comprising an input shaft integrally formed with an eccentric member; an internal gear fitted on said eccentric member; inner pins formed on said internal gear integrally therewith; an external gear formed at one end portion of an output shaft integrally therewith so as to mesh with said internal gear; one casing and another outer casing for receiving said eccentric member, said internal gear and said external gear; and inner-pin holes formed in said outer casing for insertion of said inner pins, wherein each inner-pin hole is provided with cutouts on inner and outer sides thereof, the inner and outer sides being extended opposite to each other and facing in a radial direction of said outer casing, and only the inner pins which serve to transmit a torque are arranged to be in contact with the inner-pin holes at a predetermined range of contacting location.

7. An internal meshing type planetary gear speed changing device made of plastic material comprising an input shaft integrally formed with a first eccentric member; a first external gear fitted on said first eccentric member; first inner pins formed on said first external gear integrally therewith; a first internal gear to mesh with said first external gear; a first flange integrally formed with a second eccentric member and rotatably supported by said input shaft and formed with first inner-pin holes into which said first inner pins are inserted; a second external gear fitted on said second eccentric member; second inner pins formed on said second external gear integrally therewith; a second internal gear to mesh with said second external gear; an output shaft formed with a second flange at its one end portion; and second inner-pin holes formed in said second flange for insertion of said second inner pins, wherein each inner pin is provided with cutouts on inner and outer sides thereof, the inner and outer sides being extended opposite to each other and facing in a radial direction of said external gear, and only the inner pins which serve to transmit a torque are arranged to be in contact with the inner-pin holes at a predetermined range of contacting location.

8. An internal meshing type planetary gear speed changing device made of plastic material comprising an input shaft integrally formed with a first eccentric member; a first external gear fitted on said first eccentric member; first inner pins formed on said first external gear integrally therewith; a first internal gear to mesh with said first external gear; a first flange integrally formed with a second eccentric member and rotatably supported by said input shaft and formed with first inner-pin holes into which said first inner pins are inserted; a second external gear fitted on said second eccentric member; second inner pins formed on said second external gear integrally therewith; a second internal gear to mesh with said second external gear; an output shaft formed with a second flange at its one end portion; and second inner-pin holes formed in said second flange for insertion of said second inner pins, wherein each inner-pin hole is provided with cutouts on inner and outer sides thereof, the inner and outer sides being extended opposite to each other and facing in a radial direction of said flange, and only the inner pins which serve to transmit a torque are arranged to be in contact with the inner-pin holes at a predetermined range of contacting location.

* * * * *